Patented Feb. 14, 1950

2,497,451

UNITED STATES PATENT OFFICE 2,497,451

PROCEDURE FOR THE PREPARATION OF PROSTHESES OF GREAT STRENGTH FROM METHYL METHACRYLATE MONOMER AND POLYMER

Max Haefeli, Basel, Switzerland

No Drawing. Application August 17, 1945, Serial No. 611,248. In Switzerland September 16, 1944

1 Claim. (Cl. 18—55.1)

There have been known various processes for the manufacture of prostheses, for example, for dental purposes, from artificial substances, for example from polymerized substances, such as for example, from polyvinyl-, polystyrene-, polyacryl-resins, or from condensates, for example, phenol-formaldehyde resins. In this process, the finished polymerized products or pre-condensates in a heated plastic condition were filled or injected into the mold and hardened, if necessary, or otherwise the compounds not yet polymerized, for example, monomeric vinyl- and methacrylic ester, styrenes, etc., in liquid or, if necessary, in sirupy state due to partial polymerization, are filled into the mold and converted into solid bodies by polymerization with the application of heat.

Other processes reside in methods using polymerisates in powder-granular form in combination with liquid, monomeric compounds capable of being polymerized. According to this method, granular polymerisates are mixed with the monomeric liquid in such a manner that either the polymers swell, so that they will no longer settle out in the mixture (stirring the monomer and a granular polymer together only as long as is necessary to thoroughly wet the individual granules and bring about sufficient swelling, so that the granules have little or no tendency to settle out). Also, the mixture of monomers and polymers may be stirred and kneaded in such a manner or left standing for such a period, for example, 8 to 14 days, that a mass of a soft, viscous, plastic or rubber-like consistency is obtained, plastic kneadable or soft rubbery consistency. The masses thus treated are then filled into the mold and solidified therein. These processes are broadly based upon the theory that in the preparation of molded bodies, it is necessary to thoroughly mix the monomers and polymers with one another and treat them in such a manner that the polymers are swelled by the monomers or that the two substances are mixed together to form a uniform (homogeneous) pasty, plastic or rubber-like mass. The swollen grains, thus obtained or the plastic masses obtained are then filled into the mold and solidified therein to form the desired molded body by the application of pressure and heat.

Thorough tests have now shown that prostheses of the desired superior properties, in particular of great strength, cannot be obtained with these methods.

It has now been found that in the preparation of prostheses of great strength, it is absolutely necessary on the one hand to use polymerisates which themselves are highly polymerized and soluble with difficulties. On the other hand, these polymerisates are to be mixed slightly with the monomeric liquid for a short period of half a minute at maximum, for example, for 10 to 20 seconds. As a result of said slight mixing action of half a minute at maximum, the mentioned high-molecular polymerisates which are soluble with difficulties, are merely wetted with the monomeric liquid, so that the individual grains cannot swell nor can a plastic mass be formed. The mixture constitutes a moist, loose, and still granular mass, which is filled into the mold in this condition. High polymeric polymerisates soluble with difficulties are not suited for the known methods, because these polymerisates are swelled by the monomers only slowly or yield rubber-like masses after being left standing with said monomers for a longer period, said masses being very viscous and hardly adapted to be treated (worked up) for dental purposes.

In the process according to the invention, prostheses can be made, which have a homogeneous structure and possess great strength, as it has been ascertained by means of microscopic examinations and strength tests.

A further advantage of the present invention consists therein that only a small amount of monomerous liquid is required to moisten the powder as, generally speaking, 1 weight-part of liquid is used for 3 weight-parts of powder. After having gained some experience in this respect, even smaller quantities of liquid may be used, for instance, 1 weight-part of liquid to 4–5 weight-parts of powder, particularly when operating with heated forms. On the other hand, when producing caoutchouc-like, pasty intermediate masses, fairly substantial quantities of monomerous liquids, or of low molecular polymerised products are required, in order to obtain the requisite plasticity. The more liquid that is employed, the more difficult it is, due to the shrinkage of polymerisation taking place, to produce formed bodies, in accordance with the measurements required, and to keep these bodies free of shrinkage-bubbles.

Pulverulent substances particularly adapted to the present procedure are substances with a very great surface, which are obtained by cutting off of block-polymerised products.

In order to also convert the monomerides employed into high molecular compounds by polymerisation, it is advisable to slowly heat the form filled with the monomerous-polymeric mixture to the temperature at which complete hardening takes place. This can be done, for instance, by placing the filled form into cold water, heating it up to the temperature of polymerisation, and by further heating for some time.

*Example*

For the preparation of a dental prosthesis, monomerous methylmethacryl-ester, to the extent of about ⅓ of its weight-amount, is poured over a highly polymerised, difficultly soluble, big-surfaced methylmethacrylate powder in a deep vessel, and subjected to a short mixing-process, i. e. ¼ to ½ minute, and homogeneously moistened by means of a spatula, or a glass-rod. The homogeneous wetting is recognized by the homogeneous colour of the powder. The moistened porous powder is put into the lower half of the vessel, and formed in the well known manner. This is, for instance, effected in the following way: The moistened powder is distributed in such a manner in the vessel that the greatest accumulation of material takes place at the thickest parts of the prosthesis to be prepared. Subsequently, the vessel, by the use of an intermediate viscose-foil ("Cellux, Cellophane"), can be closed, by slowly increasing the pressure, up to ½ millimetre. The vessel is re-opened, and the viscose-foil is taken away. By pressure of the moistened powder, a homogeneous mass must have been formed. A pulverulent state shows the insufficient presence of material, whereas excess of material should be removed. Subsequent to this control, the vessel is completely closed under the press, and provided with a tight hoop. The vessel mounted in this hoop is placed into a boiling-pot with cold water, which is heated immediately. As soon as the boiling-point is attained, the vessel is left for half-an-hour in the boiling water. The polymerisation and the forming has now been accomplished, and after subsequent cooling, the prosthesis may be taken out, and worked up.

Prostheses of every description can be prepared by the above mentioned procedure. According to the demands and the use required, the most convenient initial products will be selected, for instance, high polymerised vinyl-, acryl-, and methacryl-resins, or mixed polymerised products, also hardened phenol-formaldehyde-, or glyptal-resins, which are moistened by corresponding, suitable compounds, capable of polymerisation or condensation, for instance, vinylchloride, vinylacetate, solutions of hexamethylene-tetramine in phenols, and then formed to the prosthesis desired.

Tests have proved that this procedure may also be advantageously adopted for the manufacture of so-called "contact lenses" for ophthalmological purposes. Such contact lenses are directly applied to the eyeball, and are used for the purpose of correcting defects of vision, if they can no longer be corrected by means of spectacles, for instance, in the case of accidents.

I claim:

The process of manufacturing a prosthesis of great strength, which comprises mixing superficially for a maximum time of ½ minute a highly polymerized methylester of methacrylic acid in pulverulent form, the grains ranging in size from fine to coarse with 15 to 25% of a monomeric methyl ester of methacrylic acid in such a way, that the polymers do not swell and the mixture forms a moist, loose, granular mass, filling a mould immediately with said mass, heating said mould with the mass, and compressing said mass in said mould until said mass is hardened.

MAX HAEFELI.

REFERENCES CITED

The following references are of record in the file of this patent:

UNITED STATES PATENTS

| Number | Name | Date |
|---|---|---|
| 2,028,776 | Hibbert | Jan. 28, 1936 |
| 2,234,993 | Vernon et al. | Mar. 18, 1941 |
| 2,297,248 | Rudolph | Sept. 29, 1942 |
| 2,335,371 | Willis | Nov. 30, 1943 |
| 2,347,320 | Hiltner | Apr. 25, 1944 |

FOREIGN PATENTS

| Number | Country | Date |
|---|---|---|
| 484,343 | Great Britain | May 4, 1938 |
| 498,877 | Great Britain | Mar. 30, 1938 |